United States Patent
Mukherjee et al.

(10) Patent No.: US 12,238,766 B2
(45) Date of Patent: Feb. 25, 2025

(54) DEVICES AND METHODS FOR LOW POWER ADAPTIVE CHANNEL SENSING

(71) Applicant: INSTITUT MINES TELECOM, Palaiseau (FR)

(72) Inventors: Manuj Mukherjee, Paris (FR); Aslan Tchamkerten, Verrieres le Buisson (FR); Chadi Jabbour, Paris (FR)

(73) Assignee: INSTITUT MINES TELECOM, Palaiseau (FR)

( * ) Notice: Subject to any disclaimer, the term of this patent is extended or adjusted under 35 U.S.C. 154(b) by 260 days.

(21) Appl. No.: 17/787,301

(22) PCT Filed: Dec. 11, 2020

(86) PCT No.: PCT/EP2020/085695
§ 371 (c)(1),
(2) Date: Jun. 18, 2022

(87) PCT Pub. No.: WO2021/130030
PCT Pub. Date: Jul. 1, 2021

(65) Prior Publication Data
US 2023/0030851 A1 Feb. 2, 2023

(30) Foreign Application Priority Data

Dec. 24, 2019 (EP) ..................... 19306766

(51) Int. Cl.
*H04W 74/08* (2024.01)
*H04W 74/0808* (2024.01)

(52) U.S. Cl.
CPC ............... *H04W 74/0808* (2013.01)

(58) Field of Classification Search
CPC .......... H04W 52/0229; H04W 74/0808; H04B 17/318; Y02D 30/70; H04L 7/10
See application file for complete search history.

(56) References Cited

U.S. PATENT DOCUMENTS

| | | | |
|---|---|---|---|
| 8,781,408 B2 * | 7/2014 | Steer | H04B 1/0028 455/307 |
| 11,968,708 B2 * | 4/2024 | Li | H04W 74/006 |

(Continued)

OTHER PUBLICATIONS

Suh, et al., "Powering sensor networks", IEEE Potentials, vol. 23, No. 3, pp. 35-38, 2004.
"Smart Lock Reference Design with Extended Flash Memory Enabling More Than Five Years of Life on Four AA Batteries", Texas Instruments, 2018.
(Continued)

*Primary Examiner* — Abdullahi E Salad
(74) *Attorney, Agent, or Firm* — BakerHostetler

(57) ABSTRACT

A channel sensing device for detecting preamble transmission by observing a channel sensing sequence of a length smaller than or equal to a maximum given length, the channel sensing device being implemented in a receiver, the channel sensing sequence includes one or more samples. The channel sensing device is configured to: receive input parameters comprising a target reliability metric, a receiver noise profile, the maximum given length, a received power, and a probability of there being a preamble; determine channel sensing parameters given the input parameters and according to the inimization of the average energy consumption per given length, the channel sensing parameters comprising a number of channel sensing phases, and a number of samples, a receiver power consumption value, and a preamble detection threshold corresponding to each of the channel sensing phases; perform a first channel sensing phase comprising: observing a batch of samples of the one or more samples by consuming the receiver power consumption value corresponding to the first phase channel sensing phase; applying a hypothesis test comprising the comparison of a value derived from the observed samples with the preamble detection threshold corresponding to the first channel sensing phase; deciding on the presence of a preamble or on performing a subsequent channel sensing phase based on the comparison and/or whether the number of channel (Continued)

sensing phases is greater than one; a subsequent channel sensing phase comprising: observing a batch of samples by consuming the receiver power consumption value corresponding to the channel sensing phase; applying a hypothesis test comprising the comparison of a value derived from all of the so far observed samples with the preamble detection threshold; deciding on the presence of a preamble or on performing a subsequent channel sensing phase based on the comparison and/or on a condition related to a number of performed channel sensing phases compared with the number of channel sensing phases.

11 Claims, 7 Drawing Sheets

(56) References Cited

U.S. PATENT DOCUMENTS

2017/0353293 A1* 12/2017 Chandar ................ G06F 17/15
2019/0059055 A1* 2/2019 Murali ............. H04W 52/0229

OTHER PUBLICATIONS

Polastre, et al., "Versatile low power media access for wireless sensor networks", Proceedings of the 2nd International conference on Embedded networked sensor systems, pp. 95-107, 2004.
Lee, "The Design of CMOS Radio-Frequency Integrated Circuits", Cambridge University Press, pp. 364-403, 2004.
Chandar, et al., "Sampling Constrained Asynchronous Communication: How to Sleep Efficiently", IEEE Transactions on Information Theory, vol. 64, Issue: 3, pp. 1867-1878, Mar. 2018.

* cited by examiner (a) $n = 30$, $P = -60\text{dBm}$, $P_{FA} = 10^{-3}$.
Energy savings 60%-63%.

(b) $n = 50$, $P = -60\text{dBm}$, $P_{FA} = 10^{-3}$.
Energy savings 73%-76%.

(c) $n = 30$, $P = -60$dBm, $P_{FA} = 10^{-5}$.
Energy savings 40%-50%.

(d) $n = 50$, $P = -60$dBm, $P_{FA} = 10^{-5}$.
Energy savings 59%-65%.

(e) $n = 30$, $P = -80\text{dBm}$, $P_{FA} = 10^{-3}$. Energy savings 42%-52%.

(f) $n = 50$, $P = -80\text{dBm}$, $P_{FA} = 10^{-3}$.
Energy savings 53%-62%.

(g) $n = 30$, $P = -80\text{dBm}$, $P_{FA} = 10^{-5}$.
Energy savings 29%-32%.

(h) $n = 50$, $P = -80\text{dBm}$, $P_{FA} = 10^{-5}$.
Energy savings 44%-53%.

DEVICES AND METHODS FOR LOW POWER ADAPTIVE CHANNEL SENSING

CROSS-REFERENCE TO RELATED APPLICATIONS

This application is a National Stage of International patent application PCT/EP2020/085695, filed on Dec. 11, 2020, which claims priority to foreign European patent application No. EP 19306766.7, filed on Dec. 24, 2019, the disclosures of which are incorporated by reference in their entirety.

TECHNICAL FIELD

The invention relates in general to wireless communications and in particular to channel sensing in wireless receivers.

BACKGROUND

Internet of Things (IoT) devices have typically low capacity batteries, as disclosed in "J. Suh and M. Horton, Powering sensor networks, IEEE Potentials, vol. 23, no. 3, pp. 35-38, 2004", and require low energy consumption notably for communication, which is the most energy consuming task performed by IoT devices.

One specificity of device-to-device communication is that it is typically asynchronous and sparse. The events that trigger communication occur once in a long while, at random times, and related data needs to be sent to the receiver within a short delay from the time instant of the event. For example, as disclosed in "Smart Lock Reference Design with Extended Flash Memory Enabling More Than Five Years of Life on Four AA Batteries, 2018, Texas Instruments", a typical smart-lock is opened, on average, once every hour, and the lock needs to respond within 500 ms of every opening request.

Such sparse and asynchronous communication scenarios raise the question "how to distinguish information transmission from noise efficiently?". Efficiency here is in terms of energy consumption and reliability (false-alarm and miss-detection error probabilities). To aid the receiver in distinguishing information from channel noise, the transmitter is required to precede each message with a predefined sequence of symbols (e.g., a string of binary values), referred to hereafter as the preamble, for example, as described in "J. Polastre, J. Hill, and D. Culler, Versatile low power media access for wireless sensor networks, in Proc. of the 2nd Int. Conf. on Embedded Networked Sensor Systems, 2004, pp. 95-107". The receiver probes the channel from time to time and performs a binary hypothesis test, referred to as channel sensing, to decide if a preamble is present or not.

Efficient channel sensing consists of observing a sequence of samples from the channel, referred to hereafter as the 'channel sensing sequence', and determining if a preamble is present with a given level of reliability while consuming low energy.

In device-to-device communication, the channel noise is primarily due to the receiver noise. The receiver noise, in turn, is a decreasing function of the power consumption, as disclosed in "T. H. Lee, The Design of CMOS Radio-Frequency Integrated Circuits. Cambridge University Press, 2004". Therefore, a cleaner channel requires greater receiver power consumption. On the other hand, a cleaner channel reduces the number of samples needed to perform the hypothesis test with a given accuracy. This tradeoff between number of samples and power consumption can be suitably exploited to minimize the overall energy consumption for a given level of reliability.

The simplest channel sensing scheme makes a non-sequential decision after observing a fixed number of samples, and by using a power consumption that would ensure the desired reliability. Hence, this scheme consumes the same amount of energy for every possible sequence of observed samples. Sequential channel sensing schemes can potentially reduce the average energy consumption, by choosing to stop whenever a reliable decision can be made from the so-far observed samples. The existing sequential channel sensing schemes, for example, the channel sensing scheme in Berkeley Media Access Control (BMAC) as disclosed "J. Polastre, J. Hill, and D. Culler, Versatile low power media access for wireless sensor networks, in Proc. of the 2nd Int. Conf. on Embedded Networked Sensor Systems, 2004, pp. 95-107", or the multiphase scheme as disclosed in "V. Chandar and A. Tchamkerten, Sampling constrained asynchronous communication: How to sleep efficiently, IEEE Trans. on Inf. Theory, vol. 64, no. 3, pp. 1867-1878, 2018", use a fixed power consumption, and adaptively choose the number of samples to be observed before a reliable decision can be made.

Recall that the quality of an observed sample is a non-decreasing function of the power consumption, and fewer high quality samples are needed to make a decision meeting a desired reliability. Allowing sequential channel sensing schemes to adapt the power consumption based on the already observed samples can therefore further reduce the overall energy consumption. There is thus a need for sequential channel sensing schemes that adaptively chooses the both the power consumption and the number of samples to be observed.

SUMMARY

There is provided an adaptively reconfigurable channel sensing device for detecting preamble transmission by observing a channel sensing sequence of a length smaller than or equal to a maximum given length, the channel sensing device being implemented in a receiver, the channel sensing sequence comprising one or more samples, the channel sensing device being configured to:
  receive input parameters comprising a target reliability metric, a receiver noise profile, the maximum given length, a received power, and a probability of there being a preamble;
  determine channel sensing parameters given the input parameters and according to the minimization of the average energy consumption per given length, the channel sensing parameters comprising a number of channel sensing phases, and a number of samples, a receiver power consumption value, and a preamble detection threshold corresponding to each of the channel sensing phases;
  perform a first channel sensing phase comprising:
    observing a batch of samples of the one or more samples by consuming the receiver power consumption value corresponding to the first channel sensing phase, the batch of samples comprising a number of samples equal to the number of samples corresponding to the first channel sensing phase;
    applying a hypothesis test comprising the comparison of a value derived from the observed samples with the preamble detection threshold corresponding to the first channel sensing phase;

deciding on the presence of a preamble or on performing a subsequent channel sensing phase based on the comparison and/or whether the number of channel sensing phases is greater than one;

a subsequent channel sensing phase comprising:

observing a batch of samples of the one or more samples by consuming the receiver power consumption value corresponding to the channel sensing phase, the batch of samples comprising a number of samples equal to the number of samples corresponding to the channel sensing phase;

applying a hypothesis test comprising the comparison of a value derived from all of the so far observed samples with the preamble detection threshold corresponding to the channel sensing phase;

deciding on the presence of a preamble or on performing a subsequent channel sensing phase based on the comparison and/or on a condition related to a number of performed channel sensing phases compared with the number of channel sensing phases.

According to some embodiments, a decision in a channel sensing phase may comprise:

deciding against a preamble transmission if the value determined at the channel sensing phase is smaller than or equal to the preamble detection threshold corresponding to the channel sensing phase;

declaring a preamble transmission if the value determined at the channel sensing phase is larger than the preamble detection threshold corresponding to the channel sensing phase and the number of the performed channel sensing phases is equal to the number of channel sensing phases;

deciding to perform another channel sensing phase if the value determined at the channel sensing phase is larger than the preamble detection threshold corresponding to the channel sensing phase and the number of the performed channel sensing phases is lower than the number of channel sensing phases.

According to some embodiments, the reliability metric may be chosen in a group comprising a probability of false alarm and a probability of missed detection.

According to some embodiments, the channel sensing device may be configured to previously determine the receiver noise profile as a non-negative and non-increasing function relating the receiver power consumption with the variance of the receiver noise.

According to some embodiments, the variance of the receiver noise may be tunable.

According to some embodiments, the channel sensing device may be configured to previously determine the probability of there being a preamble depending on an application of the receiver.

According to some embodiments, the hypothesis test may be a likelihood test, the value being a log-likelihood ratio.

According to some embodiments, the channel sensing device may be configured to previously determine the maximum given length depending on the application of the channel sensing device.

There is also provided a wake-up receiver for waking-up a component in a wireless device, the wake-up receiver comprising a channel sensing device for detecting preamble transmission according to any preceding feature, the component being a main receiver, an actuator, or a transmitter.

There is also provided a channel sensing method for detecting preamble transmission by observing a channel sensing sequence of a length smaller than or equal to a maximum given length, the channel sensing method being implemented in a receiver, the channel sensing sequence comprising one or more samples, the channel sensing method comprising the steps consisting in:

receiving input parameters comprising a target reliability metric, a receiver noise profile, the maximum given length, a received power, and a probability of there being a preamble;

determining channel sensing parameters given the input parameters and according to the minimization of the average energy consumption per given length, the channel sensing parameters comprising a number of channel sensing phases, and a number of samples, a receiver power consumption value, and a preamble detection threshold corresponding to each of the channel sensing phases;

performing a first channel sensing phase comprising:

observing a batch of samples of the one or more samples by consuming the receiver power consumption value corresponding to the first channel sensing phase, the batch of samples comprising a number of samples equal to the number of samples corresponding to the first channel sensing phase;

applying a hypothesis test comprising the comparison of a value derived from the observed samples with the preamble detection threshold corresponding to the first channel sensing phase;

deciding on the presence of a preamble or on performing a subsequent channel sensing phase based on the comparison and/or whether the number of channel sensing phases is greater than one;

a subsequent channel sensing phase comprising:

observing a batch of samples of the one or more samples by consuming the receiver power consumption value corresponding to the channel sensing phase, the batch of samples comprising a number of samples equal to the number of samples corresponding to the channel sensing phase;

applying a hypothesis test comprising the comparison of a value derived from all of the so far observed samples with the preamble detection threshold corresponding to the channel sensing phase;

deciding on the presence of a preamble or on performing a subsequent channel sensing phase based on the comparison and/or on a condition related to a number of performed channel sensing phases compared with the number of channel sensing phases.

Advantageously, the embodiments of the invention provide low-energy channel sensing devices and methods that are capable of exploiting the tradeoff between the channel sensing parameters comprising the receiver power consumption and the number of sensed samples, while reducing the overall average energy consumed in channel sensing for wireless receivers in general and for low-power wireless receivers in particular.

The embodiments of the invention thereby provide energy efficient channel sensing techniques outperforming state-of-the-art channel sensing techniques in terms of the average energy consumption for a targeted reliability of preamble detection by adaptively switching the receiver power consumption between batches of samples and making accurate decisions on batches of samples rather than on individual samples.

Advantageously, the channel sensing techniques according to the various embodiments of the invention are adaptive in both the receiver power consumption and the number of samples observed to accurately detect preamble transmission.

Advantageously, the embodiments of the invention provide channel sensing devices and methods optimizing the tradeoff between target reliability metrics given by a target probability of false alarm and a target probability of miss-detection, and the average energy consumed for channel sensing.

Advantageously, the embodiments of the invention provide channel sensing devices and methods based on optimal binary hypothesis testing for an efficient detection of preamble transmission.

Further advantages of the present invention will become clear to the skilled person upon examination of the drawings and the detailed description.

BRIEF DESCRIPTION OF THE DRAWINGS

The accompanying drawings, which are incorporated in and constitute a part of this specification, illustrate various embodiments of the invention and, together with the general description of the invention given above, and the detailed description of the embodiments given below, serve to explain the embodiments of the invention.

DETAILED DESCRIPTION OF THE INVENTION

Embodiments of the invention provide channel sensing devices and methods for low-energy sensing in wireless receivers. More specifically, the embodiments of the invention provide devices and methods that enable efficient channel sensing at wireless receivers for detecting preamble transmission over a wireless system by exploiting the tradeoff between the receiver power consumption and the number of sensed samples to reduce the overall average energy consumed in channel sensing for given target reliability metric(s).

The channel sensing devices and methods according to the embodiments of the invention may be implemented in any wireless transceiver operating in a wireless system.

The wireless system may be a communication system, a data processing system, or a storage system comprising at least one wireless transmitter device (hereinafter referred to as a "wireless transmitter") and at least one wireless receiver device (hereinafter referred to as a "wireless receiver"). At least one wireless transmitter is configured to transmit information to at least one wireless receiver, the information being preceded with a preamble.

Figure 1:
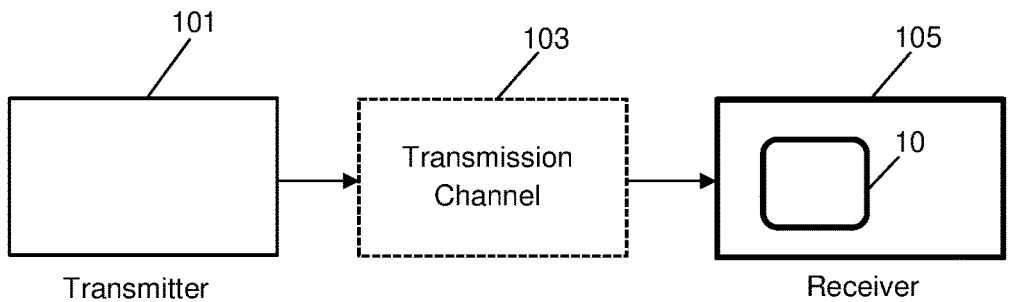
FIG. 1 represents a schematic diagram of an exemplary application of the invention.

Referring to FIG. 1, there is illustrated an exemplary wireless system 100 in which the embodiments of the invention may be implemented. The wireless system 100 may be any data transmission, communication, collection, or processing system in which at least one transmitter 101 is configured to transmit information preceded with a preamble to a wireless receiver 105 over a wireless transmission channel 103. The wireless system 100 may be a wireless sensor network.

In preferred embodiments, the wireless system 100 may be any low-power machine-to-machine (M2M) communication system used in consumer, commercial, industrial, or infrastructure applications.

Exemplary consumer applications comprise connected vehicles (Internet of Vehicles IoV), home automation/smart home, smart cities, wearable technology, and connected health.

Exemplary commercial applications comprise medical, healthcare and transportation. In medicine, a digitized healthcare system connecting medical resources and healthcare services may be used in which special monitors and sensors may be used to enable remote health monitoring and emergency notification. In transportation systems, IoT using for example wireless sensors can provide interaction between the vehicles and the infrastructure as well as inter and intra vehicular communications, smart traffic control, smart parking, safety, and road assistance. Exemplary industrial applications comprise applications in agriculture for example in farming using sensors to collect data on temperature, rainfall, humidity, wind speed, and soil content. Exemplary infrastructure applications comprise the use of IoT devices to perform monitoring and controlling operations of urban and rural infrastructures such as bridges and railway tracks.

The wireless transmitter 101 and the wireless receiver 105 may be any physical device/object provided with required hardware and/or software technologies enabling wireless communications.

In preferred embodiments, the wireless transmitter 101 and the wireless receiver 105 may be any IoT or M2M device operating in an IoT or M2M network such as medical devices, temperature and weather monitors, connected cards, smart meters, game consoles, personal digital assistants, health and fitness monitors, lights, thermostats, garage doors, security devices, drones, smart clothes, e-Health devices, robots, and smart outlets. An IoT/M2M device may be any physical device, vehicle, home appliances, or any object embedded with electronics, software, sensors, actuators, and connectivity enabling remote connection for data collection and exchange with an IoT/M2M platform for example. A sensor may be any sensory object/device (e.g. a transducer) that can measure temperature, humidity/moisture, acoustic/sound/vibration, chemical/Gas, force/load/strain/pressure, electric/magnetic, machine vision/optical/ambient light, or position/presence/proximity.

The wireless transmitter 101 and/or the wireless receiver 105 may be fixed or mobile and/or may be remotely monitored and/or controlled. The wireless receiver 105 may be equipped with power sources that provide power to the different components ensuring the functioning of this device (e.g. dry cell batteries, solar cells, and fuel cells).

The wireless transmission channel 103 may represent any wireless network enabling wireless communications in licensed or license-free spectrum. Exemplary wireless networks comprise low-power short range networks (e.g. Bluetooth mesh networking, light-Fidelity, Wi-Fi, and Near-Field communications) and low-power wide area networks (LPWAN). LPWANs are wireless networks designed to allow long-range communications at a low data rate, reducing power and cost for transmission. LPWANs are constrained networks that have challenging constraints to offer connectivity to constrained devices, such as IoT devices, that require low bandwidth, low power consumption, and low data rates. Exemplary LPWAN technologies comprise LoRaWAN (Long Range Radio Wide Area Network), Sigfox, LTE-NB1 (Long Term Evolution-Machine to Machine, Narrow Band), NB-IoT (NarrowBand IoT), and Weightless.

With reference to FIG. 1, the embodiments of the invention provide a channel sensing device 10 implemented in the wireless receiver 105, the channel sensing device 10 being configured to detect preamble transmission by observing a channel sensing sequence of a length smaller than or equal to a maximum given length, the preamble being transmitted by at least one wireless transmitter 101. The channel sensing device 10 observes the channel sensing sequence consisting of one or more samples using which the channel sensing device 10 decides on preamble transmission. The wireless receiver 105 may be configured to perform one or more actions after the detection of preamble transmission by the channel sensing device 10.

For example, in some embodiments, the wireless receiver 105 may stay awake to receive the message if the wireless receiver 105 is equipped with reception means enabling message reception.

In other embodiments, the wireless receiver 105 may be configured to transmit data or operational signals (e.g. synchronization signals) or messages to one or more devices in the wireless system 100 in response to the detection of preamble transmission. For example, in application to wireless sensor networks, the wireless receiver 105 may be implemented at a wireless sensor device that is configured to send information/data to neighbor nodes or to a processing center in response to the detection of preamble transmission.

In some embodiments in application to wake-up receivers, the channel sensing device 10 may be implemented as a part of a first receiver (not illustrated in FIG. 1) in the wireless receiver 105 that is configured to wake up a component in the wireless receiver 105. In such embodiments, the channel sensing device 10 may be configured to sense the channel to detect preamble transmission and then wake up the component.

According to some embodiments, the component may be chosen in a group comprising a main receiver, an actuator, and a transmitter.

In embodiments in which the component is a main receiver, the channel sensing device 10 may be configured to wake up the main receiver for the reception of transmitted messages.

According to some embodiments, the channel sensing device 10 may be used to detect preamble transmission in duty-cycled receivers.

The channel sensing device 10 according to the embodiments of the invention implements a channel sensing scheme that is adaptive in both the number of samples observed to detect preamble transmission and the receiver power consumption. The key idea behind the scheme is described as follows. The channel sensing device 10 begins by observing a batch of samples with a low power consumption. After observing the first batch, the channel sensing device 10 performs a test based on the observed samples to check if a preamble is present. If the decision is negative, then the channel sensing device 10 stops and declares no preamble is present. However, if the decision is positive, the channel sensing device 10 chooses to observe a next batch of samples with a higher power consumption to confirm the decision. More generally, the channel sensing device 10 can take additional batches of samples with different power consumption to confirm the presence of a preamble, but declares the absence of a preamble and stops, as soon as the test after one of these batches decides negatively. To facilitate the understanding of the description of some embodiments of the invention, there follows some notations and definitions.

N designates the length of a channel sensing sequence comprising one or more samples $Y_1, Y_2, \ldots, Y_N$ $n \geq N$ designates a maximum given length of the channel sensing sequence and corresponds to the maximum number of samples that can be sensed before deciding whether or not a preamble is present.

$P_{r,i}$ refers to the receiver power consumption required for sensing the $i^{th}$ sample $\overline{E}$ refers to the average energy consumed for observing the one or more samples $Y_1, Y_2, \ldots, Y_N$ such that $\overline{E} = \text{average}(\Sigma_{i=1}^{N} P_{r,i})$.

P denotes the received power.

$Z_i$ designates the noise corrupting the $i^{th}$ sample $Y_i$.

$\sigma_i^2$ refers to the variance of the noise $Z_i$ corrupting the $i^{th}$ sample $Y_i$.

$\sigma_{r,i}^2$ refers to the variance of the receiver noise associated with the $i^{th}$ sample $Y_i$.

$f(\cdot)$ refers to the receiver noise profile and designates a non-negative and non-increasing function relating the variance $\sigma_{r,i}^2$ of the receiver noise to the receiver power consumption $P_{r,i}$ required for sensing the $i^{th}$ sample $Y_i$ such that $\sigma_{r,i}^2 = f(P_{r,i})$.

$H_0$ refers to the hypothesis for there not being a preamble.
$H_1$ refers to the hypothesis for there being a preamble.
$p_1 = \Pr(H_1) = 1 - \Pr(H_0)$ refers to the probability of there being a preamble.

$p_s$ refers to the probability of stopping the channel sensing after a first channel sensing phase.

$P_{FA}$ refers to a target probability of false alarm.
$P_{Miss}$ refers to a target probability of miss-detection.
$L^* \geq 1$ designates a number of channel sensing phases at least equal to one.

$\{L^*; l_{j,j=1,\ldots,L^*}^*; P_{r,j,j=1,\ldots,L^*}^*; t_{j,j=1,\ldots,L^*}^*\}$ designates channel sensing parameters comprising the number of channel sensing phases $L^*$, and the number of samples (or equivalently the length of samples) $l_j^* > 0$, the receiver power consumption value $P_{r,j}^*$, and the preamble detection threshold $t_j^*$ corresponding to each of the $L^*$ channel sensing phases, the numbers of samples satisfying $\Sigma_{j=1}^{L^*} l_j^* \leq n$.

$\{l_j^*; P_{r,j}^*; t_j^*\}$ designates the set of channel sensing parameters corresponding to the $j^{th}$ channel sensing phase, for $j = 1, \ldots, L^*$.

$Y_{\Sigma_{k=1}^{j-1} l_k^* + 1}, Y_{\Sigma_{k=1}^{j-1} l_k^* + 2}, \ldots, Y_{\Sigma_{k=1}^{j-1} l_k^* + l_j^*}$ designate the $l_j^*$ samples observed at the $j^{th}$ channel sensing phase for $j = 1, \ldots, L^*$, with the samples $Y_1, Y_2, \ldots, Y_{l^*_1}$ being the samples observed at the first channel sensing phase. The receiver power consumption value $P_{r,j}^*$ is constant over the samples observed at the $j^{th}$ channel sensing phase, that is $P_{r,i} = P_{r,j}^*$ for $i = \Sigma_{k=1}^{j-1} l_k^* + 1, \ldots, \Sigma_{k=1}^{j-1} l_k^* + l_j^*$.

$v_j$ refers to a value used at the hypothesis test performed at the $j^{th}$ channel sensing phase, the value $v_j$ being derived from all the so far sensed samples $Y_i$ with $i = 1, \ldots, \Sigma_{k=1}^{j} l_k^*$.

According to the embodiments of the invention, the channel sensing device 10 is configured to observe $1 \leq N \leq n$ samples $Y_1, Y_2, \ldots, Y_N$ of a channel sensing sequence of a length $N \leq n$, the length N being smaller than or equal to the maximum given length n.

According to some embodiments, the channel sensing device 10 may be configured to previously determine the maximum given length n depending on the application of the channel sensing device 10 in the wireless system 100.

Each sample $Y_i$ may be modeled as the output of a coherent receiver that receives a signal $X_i$ corrupted by a random noise $Z_i$ such that $Y_i=X_i+Z_i$, the signal $X_i$ being dependent on a binary message $M \in \{0,1\}$.

Without loss of generality and for illustration purposes only, the following description of some embodiments of the invention will be made with reference to a binary message M modulated such that the signal $X_i$ is given by $X_i = M\sqrt{P}$, with P designating the received power.

In some embodiments, the noise $Z_i$ may be modeled as an additive white Gaussian noise of zero-mean and variance $\sigma_i^2$. In such embodiments, each sample $Y_i$ may be given by:

$$Y_i = X_i + Z_i = \sqrt{P}M + Z_i \quad (1)$$

The noise variance UL of the noise $Z_i$ corrupting the $i^{th}$ sample may be decomposed as the addition of a first term $\sigma_t^2$ and a second term $\sigma_{r,i}^2$ such that:

$$\sigma_i^2 = \sigma_t^2 + \sigma_{r,i}^2 \quad (2)$$

The first term $\sigma_t^2$ models the variance of the thermal noise and the second term $\sigma_{r,i}^2$ models the variance of the receiver noise corresponding to the noise originating from the internal circuitry of the channel sensing device 10. The variance $\sigma_{r,i}^2$ of the receiver noise (also referred to as a 'receiver noise figure') depends on the receiver power consumption $P_{r,i}$. More specifically, the variance $\sigma_{r,i}^2$ of the receiver noise is related to the receiver power consumption $P_{r,i}$ by the receiver noise profile $f(\cdot)$ which is a non-negative and non-increasing function that depends on the circuitry of the channel sensing device 10 and more particularly on the low noise amplifier used in the circuitry of the channel sensing device 10.

According to some embodiments, the channel sensing device 10 may be configured to previously estimate or approximate the receiver noise profile $f(\cdot)$ offline.

According to some embodiments, the receiver noise profile $f(\cdot)$ may be accurately estimated using electrical simulations.

According to some embodiments, the receiver noise figure may be tunable.

The channel sensing device 10 observes (or equivalently senses) the samples $Y_1, Y_2, \ldots, Y_N$ and applies a binary hypothesis test (also referred to as a 'preamble detection test') based on the observed samples in order to decide whether a preamble transmission is detected or not. The binary hypothesis test based on the observed samples considers a first hypothesis $H_0$ and a second hypothesis $H_1$. The first hypothesis $H_0$ corresponds to the hypothesis for there not being a preamble and the second hypothesis $H_1$ corresponds to the hypothesis for there being a preamble. Accordingly, the preamble detection decision made based on the binary hypothesis test consists in attributing an estimate value $\hat{M}$ to the modulated binary message M such that the estimate value $\hat{M}$ is set to a first value equal to '0' if the channel sensing device 10 decides against a preamble transmission and the estimate value $\hat{M}$ is set to a second value equal to '1' if the channel sensing device 10 decides for a preamble transmission detection.

Accordingly, the first and second hypotheses correspond to:

$$H_0: M=0, \text{ no preamble transmission is detected} \quad (3)$$

$$H_1: M=1, \text{ a preamble transmission is detected} \quad (4)$$

The probability of there being a preamble $p_1 = Pr(H_1) = 1 - Pr(H_0)$ is designated as the rarety of the preamble.

According to some embodiments, the channel sensing device 10 may be configured to previously determine the probability of there being a preamble depending on the application of the wireless receiver 105 in the wireless system 100. For example, in application to temperature sensors that need to be monitored every few minutes, the probability of there being a preamble may be set to $p_1 = 10^{-6}$. For other applications, for example fire alarms, $p_1$ can be much lower.

According to the model given in equation (1), the samples $Y_i$ for $i=1, \ldots, N$ may be modeled as independent and identically distributed random variables having Gaussian distributions under the first hypothesis and the second hypothesis given by:

$$Y_i \sim \begin{cases} \mathcal{N}(0, \sigma_j^2), \text{ given } H_0 \\ \mathcal{N}(\sqrt{P}, \sigma_j^2), \text{ given } H_1 \end{cases} \quad (5)$$

Channel sensing according to the embodiments of the invention adapts the receiver power consumption $P_{r,i}$ causally as a function of the past sensed (or equivalently observed) samples and uses a random number of samples $N \leq n$ depending on the past observed samples.

According to the embodiments of the invention, channel sensing is adaptive comprising one or more channel sensing phases, each channel sensing phase being allowed to use a different number of samples and a different receiver power consumption value in a way that the overall energy consumption is minimized for a target reliability level specified by a target reliability metric. The channel sensing scheme according to the embodiments of the invention is called 'AdaSense'.

According to some embodiments, a target reliability metric may be chosen in a group comprising a probability of false alarm denoted $P_{FA}$ and a probability of missed detection denoted $P_{Miss}$ expressed respectively as:

$$P_{FA} = Pr(\hat{M}=1|H_0) \quad (6)$$

$$P_{Miss} = Pr(\hat{M}=0|H_1) \quad (7)$$

For input parameters $\{n, P, P_{target}, f(\cdot), p_i\}$ comprising the maximum given length n of the channel sensing sequence, the received power P, a target reliability metric $P_{target} = \alpha$, the receiver noise profile $f(\cdot)$, and the probability $p_1$ of there being a preamble, the channel sensing device 10 may be configured to determine channel sensing parameters according to the minimization of the average energy consumption $\bar{E}$ per given length, the channel sensing parameters $\{L^*; l_{j,j=1,\ldots,L^*}; P_{r,j,j=1,\ldots,L^*}; t_{j,j=1,\ldots,L^*}\}$ comprising:

a number of channel sensing phases $L^* \geq 1$;

$L^*$ numbers of samples $l_j^* > 0$ for $j=1,\ldots,L^*$ satisfying $\sum_{j=1}^{L^*} l_j^* \leq n$, the number of samples $l_j^*$ corresponding to the $j^{th}$ channel sensing phase;

$L^*$ power consumption values $P_{r,j}^* \geq 0$ for $j=1,\ldots,L^*$, the receiver power consumption value $P_{r,j}^*$ corresponding to the $j^{th}$ channel sensing phase, and $L^*$ preamble detection thresholds $t_j^*$ for $j=1,\ldots,L^*$, the preamble detection threshold $t_j^*$ corresponding to the $j^{th}$ channel sensing phase.

The set $\{l_j^*; P_{r,j}^*; t_j^*\}$ designates the set of channel sensing parameters corresponding to the $j^{th}$ channel sensing phase. The channel sensing device 10 may be configured to determine the channel sensing parameters according to the optimization problem expressed as:

$$\{L^*; l^*_{j:j=1,\ldots,L^*}; P^*_{j:j=1,\ldots,L^*}; t^*_{j:j=1,\ldots,L^*}\} = \operatorname{argmin}_{\{L;l_j;P_{r,j};t_j\}: \Sigma_{j=1}^L l_j \leq n \atop P_{target}=\alpha} \overline{E} \quad (8)$$

Once the channel sensing parameters determined, the channel sensing device 10 may be configured to perform a first channel sensing phase comprising:

observing a batch of $l_1^*$ samples $Y_1, Y_2, \ldots, Y_{l_1^*}$ by consuming the receiver power consumption value $P_{r,1}^*$ corresponding to the first channel sensing phase;

applying a hypothesis test comprising the comparison of a value $v_1$ derived from the observed samples $Y_1$, $Y_2, \ldots, Y_{l_1^*}$ with the preamble detection threshold $t_1^*$ corresponding to the first channel sensing phase, and deciding on the presence of a preamble or on performing a subsequent channel sensing phase depending on the comparison between the value $v_1$ and the preamble detection threshold $t_1^*$ and/or whether the number of channel sensing phases $L^*$ is greater than one.

More specifically, the decision performed at the first channel sensing phase may comprise:

deciding against a preamble transmission (setting $\hat{M}=0$) if the value $v_1$ is smaller than or equal to the preamble detection threshold $t_1^*$;

declaring a preamble transmission (setting $\hat{M}=1$) if the value $v_1$ is larger than the preamble detection threshold $t_1^*$ and the number of phases $L^*$ is equal to one;

deciding on performing a subsequent channel sensing phase if the value $v_1$ is larger than the preamble detection threshold $t_1^*$ and the number of channel sensing phases $L^*$ is greater than one.

The $j^{th}$ channel sensing phase for $j=2, \ldots, L^*$ may comprise:

observing a batch of samples $Y_{\Sigma_{k=1}^{j-1} l_k^*+1}$, $Y_{\Sigma_{k=1}^{j-1} l_k^*+2}, \ldots, Y_{\Sigma_{k=1}^{j-1} l_k^*+l_j^*}$ by consuming the receiver power consumption value $P_{r,j}^*$ corresponding to the $j^{th}$ channel sensing phase, the batch of samples comprising a number $l_j^*>0$ of samples equal to the number of samples corresponding to the $j^{th}$ channel sensing phase;

applying a hypothesis test (a binary hypothesis test) comprising the comparison between a value $v_j$ derived from all of the so far observed samples $Y_i$ with $i=1, \ldots, \Sigma_{k=1}^{j} l_k^*$ with the preamble detection threshold $t_j^*$ corresponding to the $j^{th}$ channel sensing phase;

deciding on the presence of a preamble or on performing a subsequent channel sensing phase based on the comparison between the value $v_j$ and the preamble detection threshold $t_j^*$ and/or on a condition related to the number of the performed channel sensing phases compared with the number of channel sensing phases $L^*$.

More specifically, a decision performed at the $j^{th}$ channel sensing phase, with $j=2, \ldots, L^*$ may comprise:

deciding against a preamble transmission (setting $\hat{M}=0$) if the value $v_j$ is smaller than or equal to the preamble detection threshold t; corresponding to the $j^{th}$ channel sensing phase;

declaring a preamble transmission (setting $\hat{M}=1$) if the value $v_j$ is larger than the preamble detection threshold $t_j^*$ and the number of the performed channel sensing phases is equal to the number of phases $L^*$;

deciding on performing a subsequent channel sensing phase using a different set of channel sensing parameters $\{l_{j+1}^*; P_{r,j+1}^* \neq P_{r,j}^*; t_{j+1}^*\}$ if the value $v_j$ is larger than the preamble detection threshold t; and if the number of the performed channel sensing phases is smaller than the number of phases $L^*$.

Advantageously, as compared to the state-of-the-art channel sensing schemes, the channel sensing scheme according to the embodiments of the invention also adapts the receiver power consumption taking into consideration the past by making the decision on all of the so far sensed samples.

In preferred embodiments, the binary hypothesis test may be the likelihood test that provides optimal performance. In such embodiments, the value $v_j$ determined at the $j^{th}$ channel sensing phase may be the log-likelihood ratio value of all of the so far sensed samples $Y_i$ with $i=1, \ldots, \Sigma_{k=1}^{j} l_k^*$ given by:

$$v_j = \sum_{k=1}^{j} \frac{\sqrt{P}}{\sigma_k^2} \sum_{i=1+\Sigma_{t=1}^{k-1} l_t^*}^{\Sigma_{t=1}^{k-1} l_t^* + l_k^*} Y_i - \sum_{k=1}^{j} \frac{P l_k^*}{2\sigma_k^2} \quad (9)$$

Advantageously, the likelihood test enables efficient hypothesis testing taking into account the sensing quality and the receiver noise figure.

For illustration purposes, the channel sensing scheme according to the embodiments of the invention is detailed in the following for channel sensing parameters given by $\{L^*=2, l_1^*; l_2^*, P_{r,1}^*, P_{r,2}^*, t_1^*, t_2^*\}$ corresponding to a two-phase AdaSense channel sensing scheme.

Given the channel sensing parameters $\{L^*=2, l_1^*, l_2^*, P_{r,1}^*, P_{r,2}^*, t_1^*, t_2^*\}$, the channel sensing device 10 may be configured to perform a first channel sensing phase to observe a first batch of samples comprising $l_1^*>0$ samples by consuming a receiver power consumption value $P_{r,1}^*$. Then the channel sensing device 10 may be configured to determine a value $v_1$ from the observed $l_1^*$ samples $Y_1$, $Y_2, \ldots, Y_{l_1^*}$.

In embodiments in which the hypothesis test is the likelihood test, the channel sensing device 10 may be configured to determine the value $v_1$ as:

$$v_1 = \frac{\sqrt{P}}{\sigma_1^2} \Sigma_{j=1}^{l_1^*} Y_j - \frac{l_1^* P}{2\sigma_1^2} \quad (10)$$

The channel sensing device 10 may be then configured to perform a hypothesis test by comparing the value $v_1$ to the first preamble detection threshold $t_1^*$. The first channel sensing phase may comprise:

deciding against a preamble transmission if the value $v_1$ is smaller than or equal to the first preamble detection threshold $t_1^*$, i.e., if $$\frac{\sqrt{P}}{\sigma_1^2} \Sigma_{j=1}^{l_1^*} Y_j - \frac{l_1^* P}{2\sigma_1^2} \leq t_1^*$$

in embodiments using the likelihood test, or deciding on performing a second channel sensing phase using a different set of channel sensing parameters $\{l_2^*; P_{r,2}^* \neq P_{r,1}^*; t_2^*\}$ if the value $v_1$ is larger than the first preamble detection threshold $t_1^*$.

If the channel sensing device 10 performs a second channel sensing phase using a set of channel sensing parameters $\{l_2^*; P_{r,2}^* \neq P_{r,1}^*; t_2^*\}$, the second channel sensing phase may comprise:

observing a batch of $l_2^*$ samples $Y_{l_1^*+1}, Y_{l_1^*+2}, \ldots, Y_{l_1^*+l_2^*}$, by consuming the receiver power consumption value $P_{r,2}^*$ applying a hypothesis test by comparing a value $v_2$ derived from all of the so far sensed samples $Y_i$ with $i=1, \ldots, l_1^*+l_2^*$ with the second preamble detection threshold $t_2^*$, and deciding on the presence of a preamble depending on the comparison between the value $v_2$ and the preamble detection threshold $t_2^*$ such that:

a decision against a preamble transmission is made if the value $v_2$ is smaller than or equal to the preamble detection threshold $t_2^*$, and a preamble transmission is declared if the value $v_2$ is larger than the preamble detection threshold $t_2^*$.

The channel sensing device 10 may be configured to determine the value $v_2$ from the $l_1^*+l_2^*$ samples $Y_1, Y_2, \ldots, Y_{l_1^*+l_2^*}$ such that:

$$v_2 = \frac{\sqrt{P}}{\sigma_1^2}\Sigma_{j=1}^{l_1^*} Y_j - \frac{l_1^* P}{2\sigma_1^2} + \frac{\sqrt{P}}{\sigma_2^2}\Sigma_{j=l_1^*+1}^{l_1^*+l_2^*} Y_j - \frac{l_2^* P}{2\sigma_2^2} \quad (11)$$

According to some embodiments in which the target reliability is specified by a first target reliability metric corresponding to a target probability of false alarm $P_{FA}=\alpha$ and a second target reliability metric corresponding to a target probability of missed detection $P_{Miss}=\beta$, it is shown by the inventors that, using the likelihood test for a two-phase channel sensing scheme with channel sensing parameters $L^*=2$, $l_1^*$, $l_2^*$, $P_{r,1}^*, P_{r,2}^* > P_{r,1}^*$, $t_{1^*, t_{2^*}}$, the probability of false alarm and the probability of missed detection can be respectively expressed as:

$$P_{FA} = \frac{1}{\sqrt{2\pi a}} \int_{t_1^*}^{\infty} e^{-\frac{1}{2a}(q+\frac{a}{2})^2} Q\left(\frac{t_2^* - q + \frac{b}{2}}{\sqrt{b}}\right) dq \quad (12)$$

$$P_{Miss} = Q\left(\frac{-t_1^* + \frac{a}{2}}{\sqrt{a}}\right) + \frac{1}{\sqrt{2\pi a}} \int_{t_1^*}^{\infty} e^{-\frac{1}{2a}(q-\frac{a}{2})^2} Q\left(\frac{t_2^* + q + \frac{b}{2}}{\sqrt{b}}\right) dq \quad (13)$$

In equations (12) and (13), $Q(\cdot)$ designates the Q-function defined as defined as $$Q(x) = \frac{1}{\sqrt{2\pi}} \int_x^{\infty} \exp\left(-\frac{u^2}{2}\right) du, \; a = \frac{l_1^* P}{\sigma_1^2}, \text{ and } b = \frac{l_2^* P}{\sigma_2^2}.$$

The probability $p_s$ of stopping at the first channel sensing phase is shown to be expressed as:

$$p_s = (1-p_1)\left(1 - Q\left(\frac{t_1^* + \frac{a}{2}}{\sqrt{a}}\right)\right) + p_1 Q\left(\frac{-t_1^* + \frac{a}{2}}{\sqrt{a}}\right) \quad (14)$$

The average energy consumption E can then be expressed in terms of $p_s$ as:

$$\overline{E} = p_s l_1^* P_{r,1}^* + (1-p_s)(l_1^* P_{r,1}^* + l_2^* P_{r,2}^*) \quad (15)$$

The probability $p_s$ may be approximated by $$1 - Q\left(\frac{t_1^* + \frac{a}{2}}{\sqrt{a}}\right)$$

when the probability $p_1$ of there being a preamble is significantly lower than one, i.e., if $p_1 \ll 1$.

Figure 2:
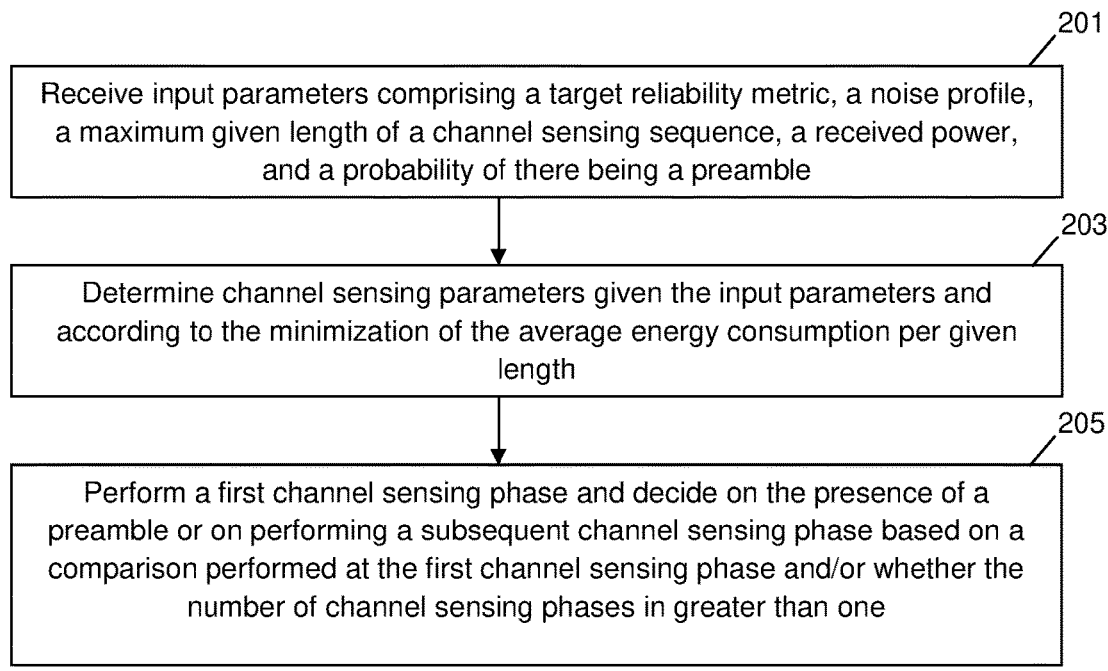
FIG. 2 is a flowchart illustrating a channel sensing method, according to some embodiments of the invention.

Referring to FIG. 2, there is also provided a channel sensing method implemented in a receiver for detecting preamble transmission by observing a channel sensing sequence of a length N smaller than or equal to a maximum given length n, the channel sensing sequence comprising one or more samples $Y_1, Y_2, \ldots, Y_N$. The channel sensing method may be implemented in a wireless receiver (hereinafter referred to as a receiver).

Without loss of generality, the description of the channel sensing method will be made with reference to binary messages modulated according to equation (1).

At step 201, input parameters may be received, comprising a target reliability metric $P_{target}$, the receiver noise profile $f(\cdot)$, the maximum given length n of the channel sensing sequence, a received power P, and the probability $p_1$ of there being a preamble.

According to some embodiments, step 201 may comprise determining the probability of there being a preamble depending on the application of the receiver implementing the channel sensing method.

According to some embodiments, step 201 may comprise determining the maximum given length n depending on the application of the receiver.

According to some embodiments, step 201 may comprise determining or estimating or approximating the receiver noise profile offline.

According to some embodiments, step 201 may comprise estimating the receiver noise profile $f(\cdot)$ using electrical simulations.

According to some embodiments, a target reliability metric may be chosen in a group comprising a target probability of false alarm and a target probability of missed detection.

At step 203, channel sensing parameters may be determined given the input parameters $\{n, P, P_{target}, f(\cdot), p_1\}$ and according to the minimization of the average energy consumption $\overline{E}$ per given length as given in the optimization problem in equation (8). The channel sensing parameters may comprise:

a number of channel sensing phases $L^* \geq 1$;

$L^*$ numbers of samples $l_j^* > 0$ for $j=1, \ldots, L^*$ satisfying $\Sigma_{j=1}^{L^*} l_j^* \leq n$, the number of samples $l_j^*$ corresponding to the $j^{th}$ channel sensing phase;

$L^*$ receiver power consumption values $P_{r,j}^* \geq 0$ for $j=1, \ldots, L^*$, the receiver power consumption value $P_{r,j}^*$ corresponding to the $j^{th}$ channel sensing phase, and $L^*$ preamble detection thresholds $t_j^*$ for $j=1, \ldots, L^*$, the preamble detection threshold $t_j^*$ corresponding to the $j^{th}$ channel sensing phase.

At step 205, a first channel sensing phase may be performed and a decision on the presence of a preamble or on performing a subsequent channel sensing phase may be taken based on a comparison performed at the first channel sensing phase and/or whether the number of channel sensing phases is greater than one. The first channel sensing phase may comprise:

observing a batch of $l_1^*$ samples $Y_1, Y_2, \ldots, Y_{l_1^*}$ by consuming the receiver power consumption value $P_{r,1}^*$ corresponding to the first channel sensing phase;

applying a hypothesis test comprising the comparison of a value $v_1$ derived from the observed samples $Y_1, Y_2, \ldots, Y_{l_1^*}$ with the preamble detection threshold $t_1^*$ corresponding to the first channel sensing phase, and deciding on the presence of a preamble or on performing a channel sensing phase depending on the comparison between the value $v_1$ and the preamble detection threshold $t_1^*$ and/or whether the number of channel sensing phases in greater than one.

More specifically, a decision performed at the first channel sensing phase may comprise:
- deciding against a preamble transmission (setting $\overline{M}=0$) if the value $v_1$ is smaller than or equal to the preamble detection threshold $t_1^*$;
- declaring a preamble transmission (setting $\overline{M}=1$) if the value $v_1$ is larger than the preamble detection threshold $t_1^*$ and the number of phases $L^*$ is equal to one;
- deciding on performing a subsequent channel sensing phase if the value $v_1$ is larger than the preamble detection threshold $t_1^*$ and the number of channel sensing phases is greater than one.

Figure 3:
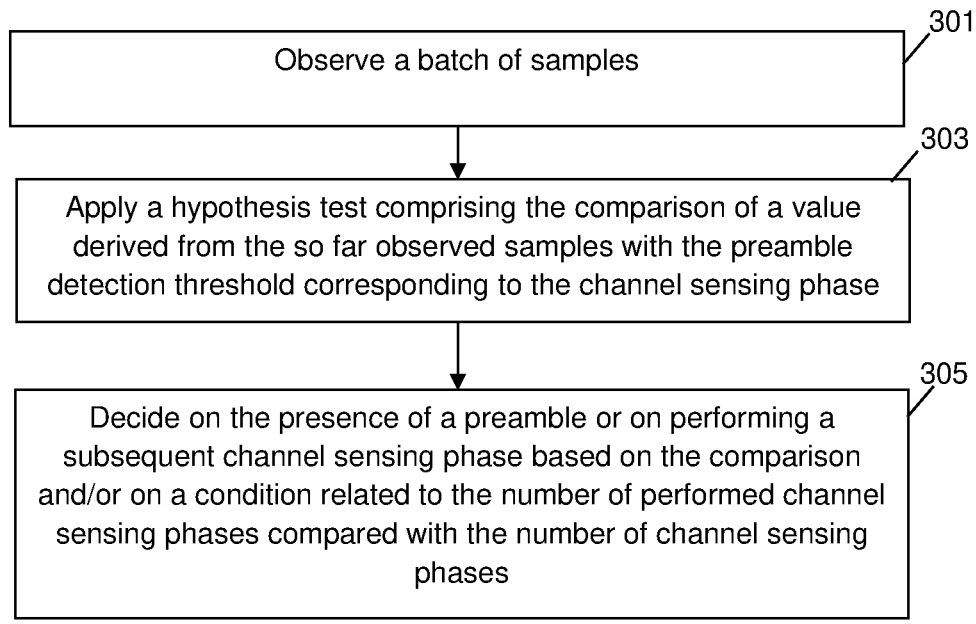
FIG. 3 is a flowchart illustrating a channel sensing phase, according to some embodiments of the invention.

FIG. 3 is a flowchart illustrating the steps of a $j^{th}$ channel sensing phase according to some embodiments of the invention using the channel sensing parameters $\{L^*; l_j^*; P_{r,j}^*; t_j^*\}$ determined at step 203, for $j=2, \ldots, L^*$.

Accordingly, at step 301, a batch of $l_j$ samples $Y_{\Sigma_{k=1}^{j-1} l_k^*+1}$, $Y_{\Sigma_{k=1}^{j-1} l_k^*+2}, \ldots, Y_{\Sigma_{k=1}^{j-1} l_k^*+l_j^*}$ of the one or more samples of the channel sensing sequence may be observed by consuming the receiver power consumption value $P_{r,j}^*$ corresponding to the $j^{th}$ channel sensing phase.

At step 303, a hypothesis test (a binary hypothesis test) may be performed comprising the comparison between a value $v_1$ derived from all of the so far observed samples $Y_i$ for $i=1, \ldots, \Sigma_{k=1}^{j} l_k^*$ with the preamble detection threshold $t$; corresponding to the $j^{th}$ channel sensing phase.

At step 305, a decision on the presence of a preamble or on performing a subsequent channel sensing phase may be taken based on the comparison between the value $v_1$ and the preamble detection threshold $t_j^*$ and/or on a condition related to the number of the performed channel sensing phases compared with the number of channel sensing phases $L^*$.

More specifically, a decision taken at step 305 in the $j^{th}$ channel sensing phase may comprise:
- deciding against a preamble transmission if the value $v_1$ is smaller than or equal to the preamble detection threshold $t_j^*$ corresponding to the $j^{th}$ channel sensing phase;
- declaring a preamble transmission if the value $v_1$ is larger than the preamble detection threshold $t$; and the number of the performed channel sensing phases is equal to the number of phases $L^*$;
- deciding on performing a subsequent channel sensing phase using a different set of channel sensing parameters $\{l_{j+1}^*; P_{r,j+1}^* \neq P_{r,j}^*; t_{j+1}^*\}$ if the value $v_j$ is larger than the preamble detection threshold $t_j^*$ and if the number of the performed channel sensing phases is smaller than the number of phases $L^*$.

According to some embodiments, the hypothesis test may be the optimal likelihood test. In such embodiments, step 303 may comprise determining the value $v_j$ as the likelihood ratio value of all of the so far observed samples $Y_i$ with $i=1, \ldots, \Sigma_{k=1}^{j} l_k^*$ as expressed in equation (9).

Figure 4:
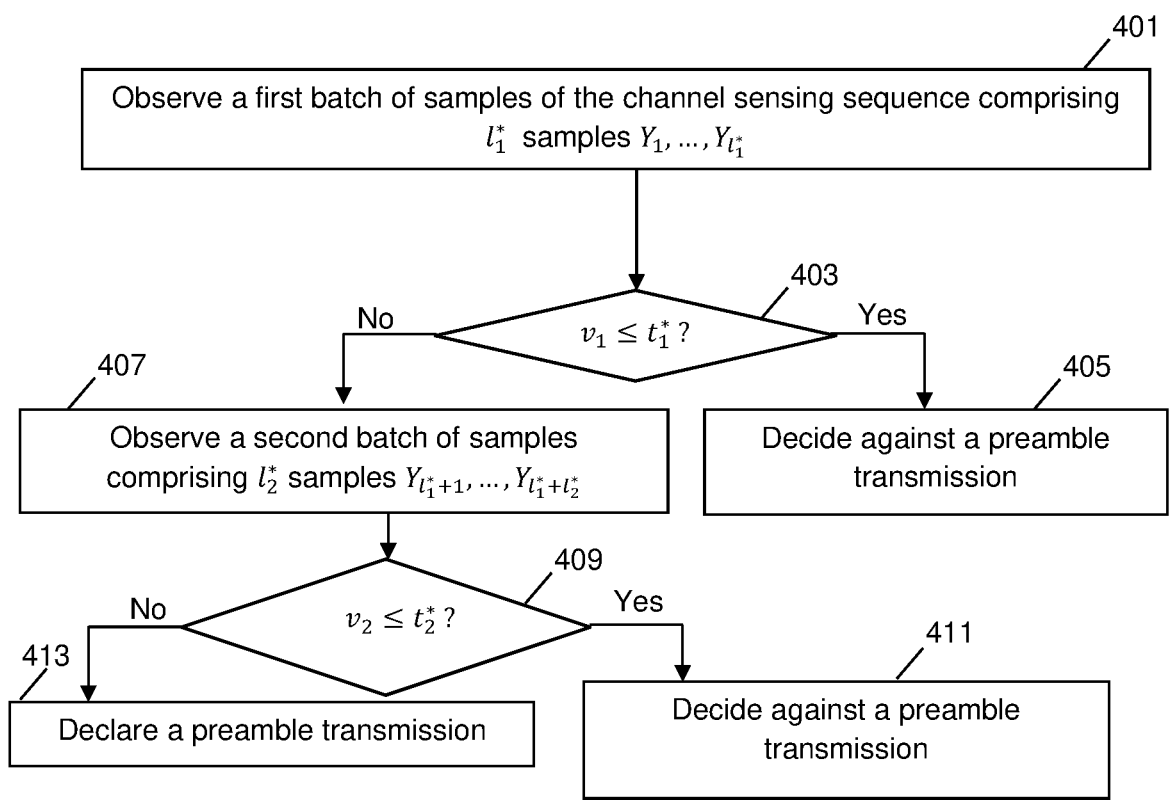
FIG. 4 is a flowchart illustrating a two-phase channel sensing method, according to some embodiments of the invention.
Figure 5A:
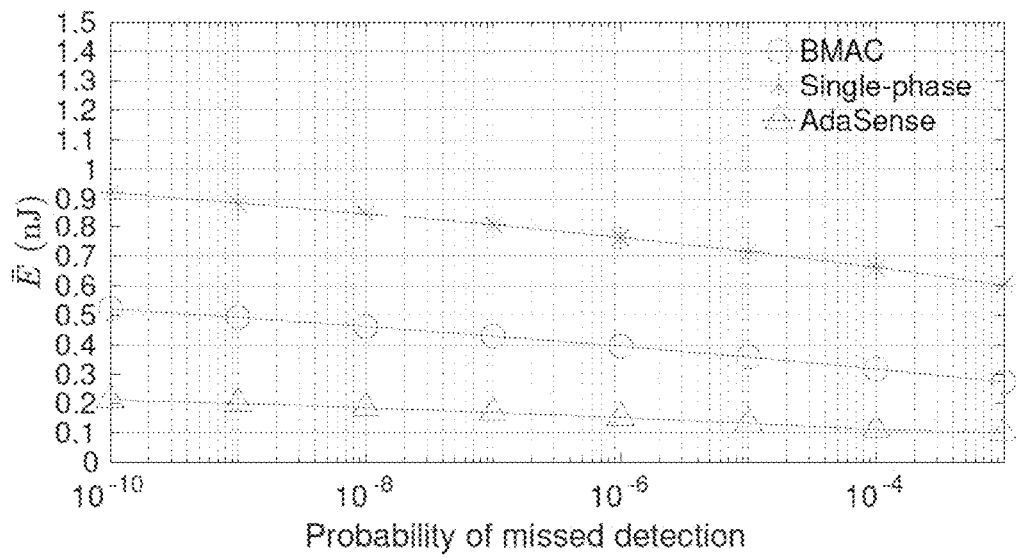
FIGS. 5A to 5H depict diagrams illustrating the performance obtained using state-of-the-art channel sensing schemes and a two-phase channel sensing scheme according to some embodiments of the invention, performance being evaluated in terms of the average energy consumption as a function of the probability of missed detection.
Figure 5B:
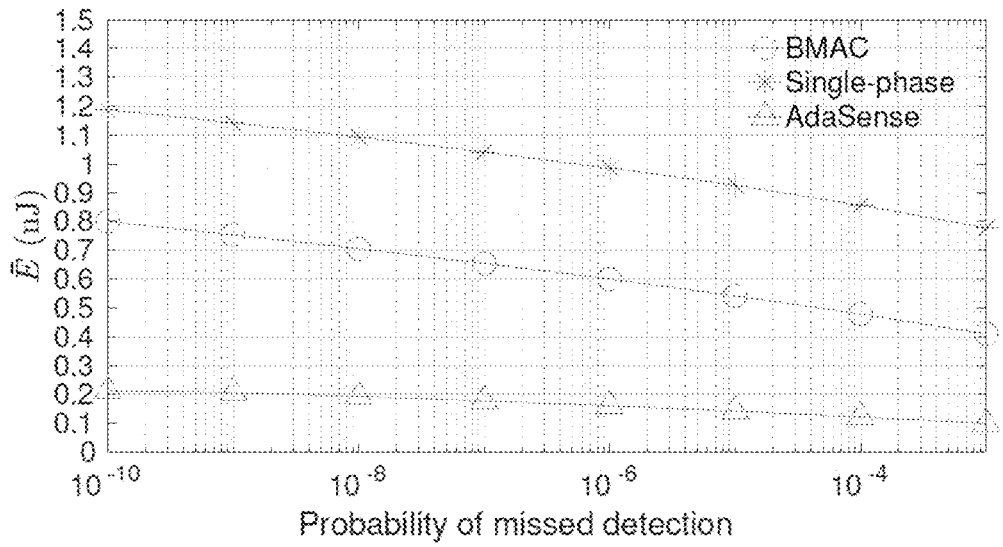
Figure 5C:
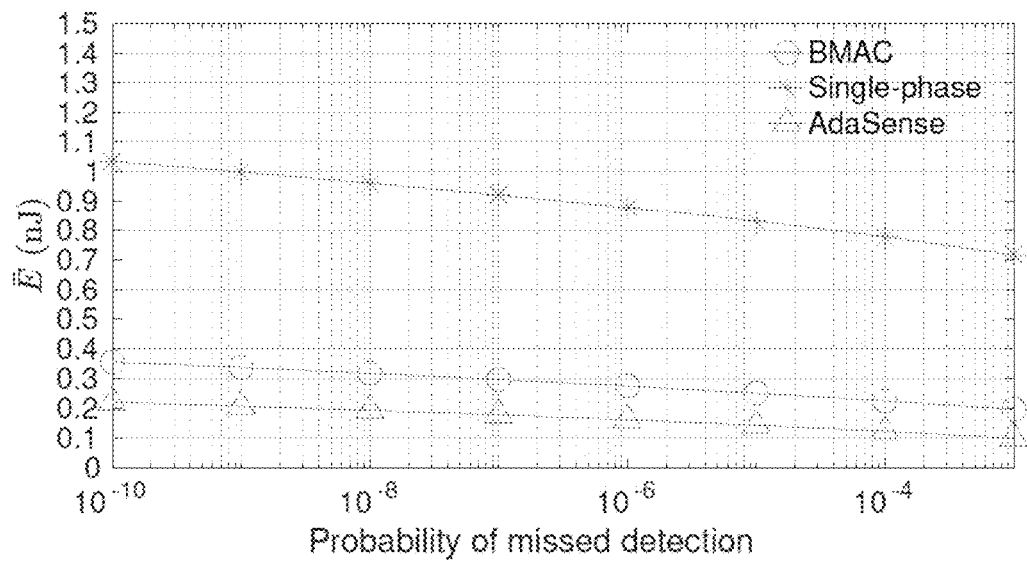
Figure 5D:
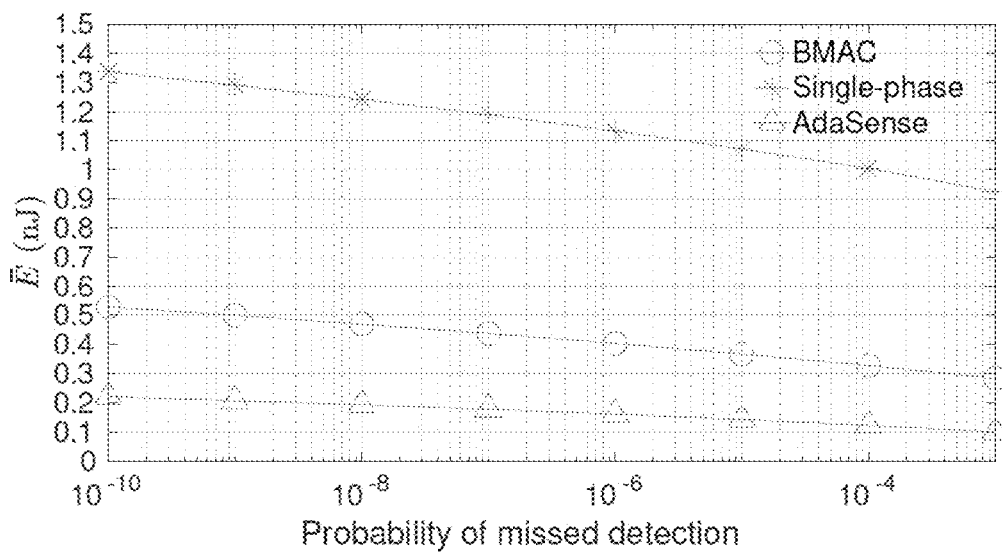
Figure 5E:
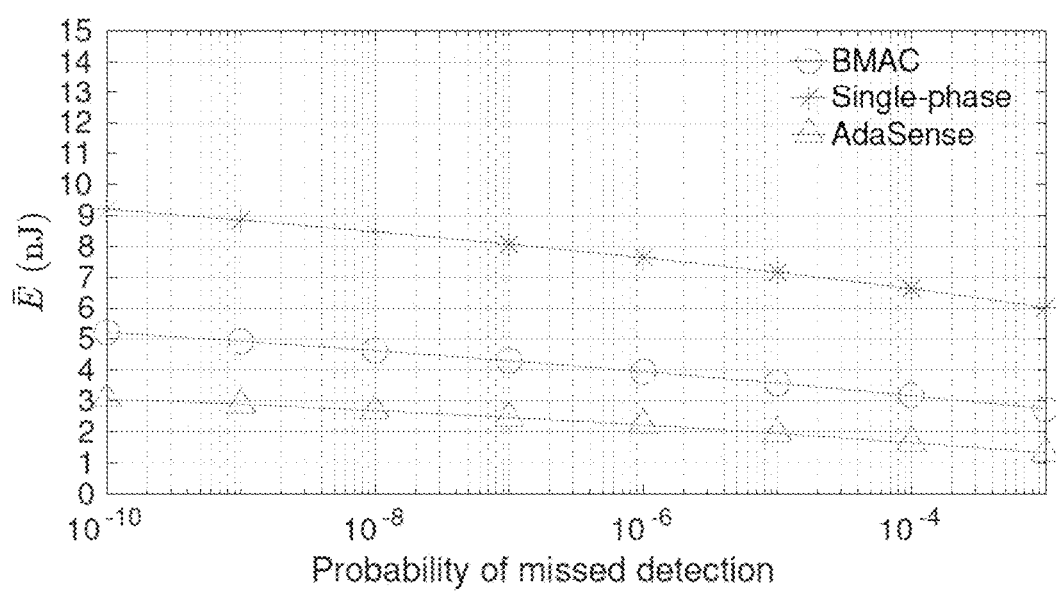
Figure 5F:
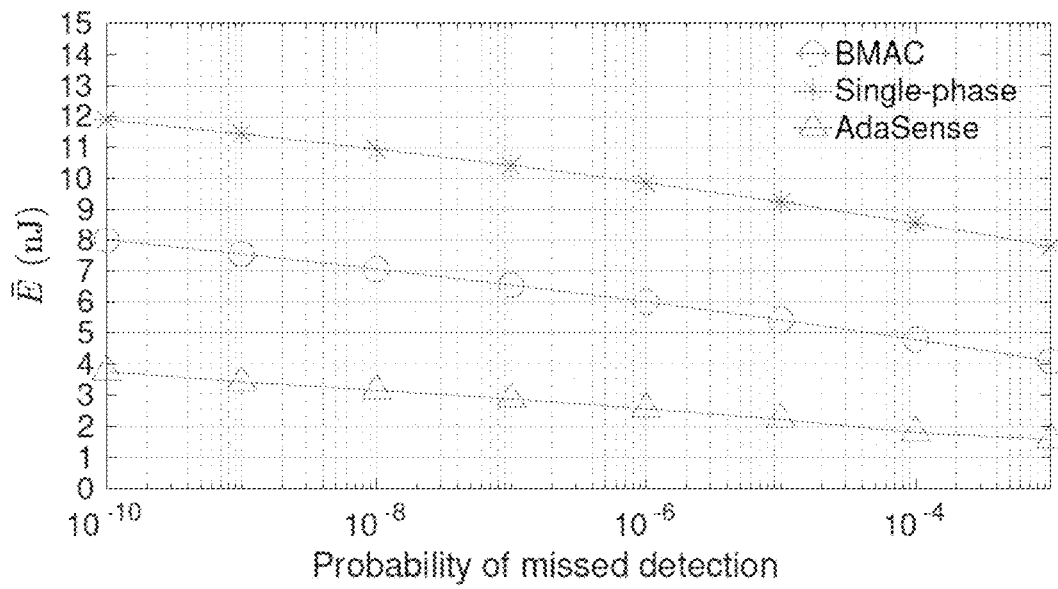
Figure 5G:
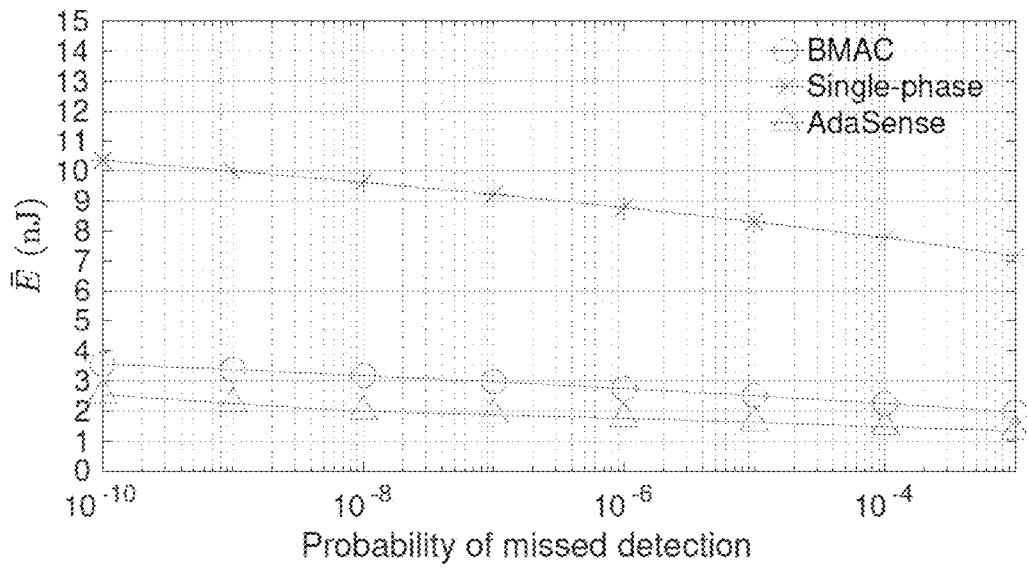
Figure 5H:
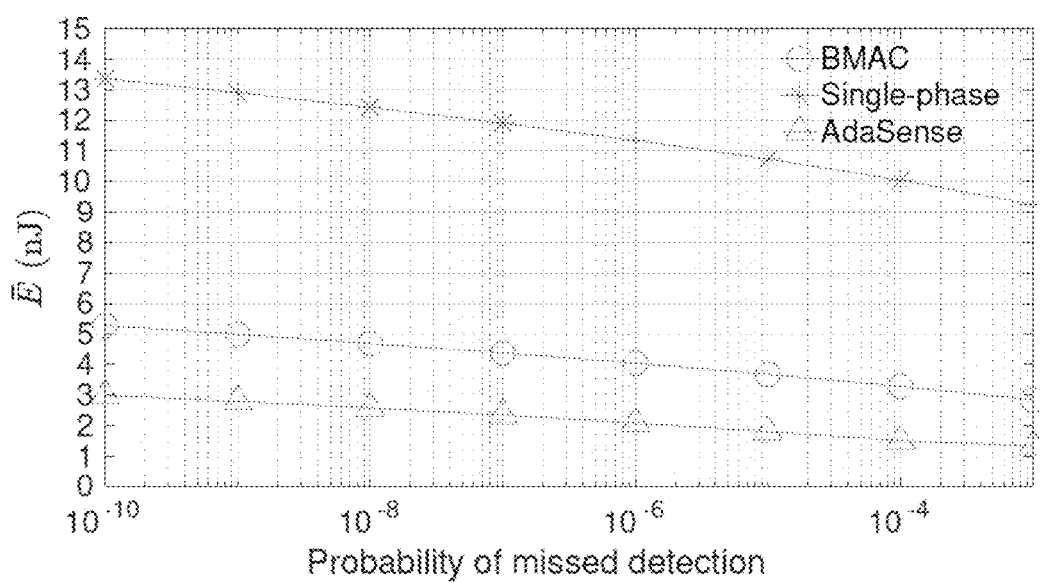

FIG. 4 is a flowchart illustrating a two-phase channel sensing method according to some embodiments of the invention in which the set of channel sensing parameters $\{L^*=2, l_1^*, l_2^*, P_{r,1}^*, P_{r,2}^*, t_1^*, t_2^*\}$ is determined according to the minimization of the average energy consumption for a target reliability specified by a target probability of false alarm $P_{FA}=\alpha$ and a target probability of missed detection $P_{Miss}=\beta$.

According to this embodiment, the channel sensing method comprises two phases, meaning that a preamble transmission detection decision is delivered at the first channel sensing phase or at the second channel sensing phase, no further channel sensing phase being performed.

Based on the determined channel sensing parameters, at step 401, a first batch of samples comprising $l_1^*>0$ may be sensed by consuming a receiver power consumption value $P_{r,1}^*$.

At step 403, a hypothesis test may be performed to compare a value $v_1$ with the preamble detection threshold $t_1^*$, the value $v_1$ being derived from the $l_1^*$ samples $Y_1, Y_2, \ldots, Y_{l_1^*}$.

In embodiments in which the hypothesis test is the likelihood test, the value $v_1$ may be given by equation (10).

If it is determined at step 403 that the value $v_1$ is smaller than or equal to the preamble detection threshold $t_1^*$, step 405 is performed to decide against a preamble transmission.

If it is determined at step 403 that the value $v_1$ is larger than the preamble detection threshold $t_1^*$, a second channel sensing phase is performed in steps 407 to 413 using the set of channel sensing parameters $\{l_2^*; P_{r,2}^* \neq P_{r,1}^*; t_2^*\}$.

At step 407, a batch of $l_2^*$ samples $Y_{l_1^*+1}, Y_{l_1^*+2}, \ldots, Y_{l_1^*+l_2^*}$ of the one or more samples of the channel sensing sequence may be observed by consuming a receiver power consumption value $P_{r,2}^*$.

At step 409, a hypothesis test may be performed to compare a value $v_2$ derived from all of the so far sensed samples $Y_i$ with $i=1, l_1^*+l_2^*$ with the second preamble detection threshold $t_2^*$. According to some embodiments in which the hypothesis test is the likelihood test, the value $v_2$ may be given by equation (11).

If it is determined at step 409 that the value $v_2$ is smaller than or equal to the preamble detection threshold $t_2^*$, a decision against a preamble transmission is performed in step 411. Alternatively, a preamble transmission is declared at step 413.

For this two-phase channel sensing scheme, it is shown that the probability of false detection and the probability of false alarm can be expressed respectively as in equations (12) and (13).

The performance of the two-phase AdaSense channel sensing method has been compared to the performance of two state-of-the-art channel sensing schemes respectively referred to as 'single phase channel sensing scheme' and a channel sensing scheme used in BMAC (referred to as 'BMAC scheme'). In the single phase scheme, channel sensing is performed using constant receiver power consumption and a number of samples equal to the maximum number of samples that can be sensed before detecting a preamble transmission, that is N=n. In the BMAC scheme, constant receiver power consumption is used and preamble detection testing is based on individual samples, i.e., by comparing each sample with a same threshold. Performance of the three channel sensing schemes has been evaluated in the context of wake-up receivers considering: a maximum given length of the channel sensing sequence equal to n=30 and n=50, a target probability of false alarm $P_{FA}=10^{-3}$ and $P_{FA}=10^{-5}$, a received power P=−80 dBm and P=−60 dBm, a receiver noise profile given by $$\sigma_{r,i}^2 = f(P_{r,i}) = \frac{10^{-20,5}}{P_{r,i}^2},$$

and neglecting the thermal noise by assuming $\sigma_i^2 = \sigma_{r,i}^2$. Performance has been evaluated in terms of the average energy consumption $\overline{E}$ as a function of the probability of missed detection $P_{Miss}$ for different parameters $n \in \{30,50\}$, $P_{FA} \in \{10^{-3}, 10^{-5}\}, P \in \{-60 \text{ dBm}, -80 \text{ dBm}\}$ and assuming $p_1 \ll 10^{-4}$.

FIGS. 5A to 5H depict diagrams evaluating the performance obtained for the BMAC, the single phase channel sensing scheme, and two-phase AdaSense scheme according to the embodiments of the invention in terms of the average energy consumption $\bar{E}$ as a function of the probability of missed detection $P_{Miss}$ for different parameters $n$, $P_{FA}$, P. Numerical results show that the two-phase AdaSense channel sensing scheme according to some embodiments of the invention is the most energy-efficient channel sensing scheme. Energy savings compared to state-of-the-art schemes vary from 30% to 70% depending on the regimes of $n, P_{FA}, P$ and $P_{Miss}$. Higher values of $n, P_{FA}, P$ and $P_{Miss}$ provide higher savings while the least energy savings of 29% is obtained for $n=30$ $P_{FA}=10^{-5}$, $P=-80$ dBm and $P_{Miss}=10^{-10}$.

While the invention has been illustrated by a description of various embodiments and while these embodiments have been described in considerable detail, it is not the intention of the Applicant to restrict or in any way limit the scope of the appended claims to such detail. Additional advantages and modifications will readily appear to those skilled in the art.

Further, in certain alternative embodiments, the functions, acts, and/or operations specified in the flow charts, sequence diagrams, and/or block diagrams may be re-ordered, processed serially, and/or processed concurrently consistent with embodiments of the invention. Moreover, any of the flow charts, sequence diagrams, and/or block diagrams may include more or fewer blocks than those illustrated consistent with embodiments of the invention.

The invention claimed is:

1. A channel sensing device, implemented in a wireless receiver in a wireless system, for detecting a presence of a preamble transmitted by a wireless transmitter over a wireless transmission channel in said wireless system, the channel sensing device being configured to detect the presence of the preamble by observing a channel sensing sequence of a given length smaller than or equal to a maximum given length, said channel sensing sequence comprising one or more samples, wherein the channel sensing device:
   receives input parameters comprising a target reliability metric, a receiver noise profile, said maximum given length, a received power, and a probability of a presence of a preamble;
   determines channel sensing parameters given said input parameters and according to the minimization of the average energy consumption per given length, said channel sensing parameters comprising a number of channel sensing phases, and a number of samples, a receiver power consumption value, and a preamble detection threshold corresponding to each of said channel sensing phases;
   performs a first channel sensing phase comprising:
      observing a batch of samples of said one or more samples by consuming the receiver power consumption value corresponding to the first channel sensing phase, said batch of samples comprising a number of samples equal to the number of samples corresponding to the first channel sensing phase;
      applying a hypothesis test comprising the comparison of a value derived from the observed samples with the preamble detection threshold corresponding to the first channel sensing phase;
      deciding on the presence of a preamble or on performing a subsequent channel sensing phase depending on said comparison and/or whether the number of channel sensing phases is greater than one; and
   a subsequent channel sensing phase comprising:
      observing a batch of samples of said one or more samples by consuming the receiver power consumption value corresponding to said channel sensing phase, said batch of samples comprising a number of samples equal to the number of samples corresponding to said channel sensing phase;
      applying a hypothesis test comprising the comparison of a value derived from all of the so far observed samples with the preamble detection threshold corresponding to said channel sensing phase;
      deciding on the presence of a preamble or on performing a subsequent channel sensing phase based on said comparison and/or on a condition related to a number of performed channel sensing phases compared with said number of channel sensing phases.

2. The channel sensing device of claim 1, wherein a decision performed at a channel sensing phase comprises:
   deciding against the presence of a preamble if the value determined at said channel sensing phase is smaller than or equal to the preamble detection threshold corresponding to said channel sensing phase;
   declaring the presence of a preamble if said value is larger than said preamble detection threshold and the number of the performed channel sensing phases is equal to the number of channel sensing phases;
   deciding to perform a channel sensing phase if said value is larger than said preamble detection threshold and the number of the performed channel sensing phases is lower than said number of channel sensing phases.

3. The channel sensing device of claim 1, wherein said reliability metric is chosen in a group comprising a probability of false alarm and a probability of missed detection.

4. The channel sensing device of claim 1, wherein the channel sensing device is configured to previously determine said receiver noise profile as a non-negative and non-increasing function relating the receiver power consumption with the variance of the receiver noise.

5. The channel sensing device of claim 4, wherein said variance of the receiver noise is tunable.

6. The channel sensing device of claim 1, wherein the channel sensing device is configured to previously determine said probability depending on an application of said receiver.

7. The channel sensing device of claim 1, wherein said hypothesis test is a likelihood test, said value being a log-likelihood ratio value.

8. The channel sensing device of claim 1, wherein the channel sensing device is configured to previously determine said maximum given length depending on an application of said channel sensing device.

9. A wireless receiver comprising a wake-up receiver for waking-up a component in said wireless device, wherein the channel sensing device according to claim 1 is implemented as part of the wake-up receiver.

10. The wake-up receiver of claim 9, wherein said component is chosen in a group comprising a main receiver, an actuator, and a transmitter.

11. A channel sensing method for detecting a presence of transmitted preamble by observing a channel sensing sequence of a length smaller than or equal to a maximum given length, said channel sensing method being implemented in a receiver, said channel sensing sequence comprising one or more samples, wherein the channel sensing method comprises the steps consisting in:

receiving input parameters comprising a target reliability metric, a receiver noise profile, said maximum given length, a received power, and a probability of a presence of a preamble;

determining channel sensing parameters given said input parameters and according to the minimization of the average energy consumption per given length, said channel sensing parameters comprising a number of channel sensing phases, and a number of samples, a receiver power consumption value, and a preamble detection threshold corresponding to each of said channel sensing phases;

performing a first channel sensing phase comprising:

observing a batch of samples of said one or more samples by consuming the receiver power consumption value corresponding to said first channel sensing phase, said batch of samples comprising a number of samples equal to the number of samples corresponding to the first channel sensing phase;

applying a hypothesis test comprising the comparison of a value derived from the observed samples with the preamble detection threshold corresponding to the first channel sensing phase;

deciding on the presence of a preamble or on performing a subsequent channel sensing phase based on said comparison and/or whether the number of channel sensing phases is greater than one;

a subsequent channel sensing phase comprising:

observing a batch of samples of said one or more samples by consuming the receiver power consumption value corresponding to said channel sensing phase, said batch of samples comprising a number of samples equal to the number of samples corresponding to said channel sensing phase;

applying a hypothesis test comprising the comparison of a value derived from all of the so far observed samples with the preamble detection threshold corresponding to said channel sensing phase;

deciding on the presence of a preamble or on performing a subsequent channel sensing phase based on said comparison and/or on a condition related to a number of performed channel sensing phases compared with said number of channel sensing phases.

* * * * *